United States Patent
Dunna et al.

(10) Patent No.: US 11,546,022 B2
(45) Date of Patent: Jan. 3, 2023

(54) VIRTUAL MIMO WITH SMART SURFACES

(71) Applicant: The Regents of the University of California, Oakland, CA (US)

(72) Inventors: Manideep Dunna, San Diego, CA (US); Chi Zhang, San Diego, CA (US); Dinesh Bharadia, San Diego, CA (US); Daniel Sievenpiper, San Diego, CA (US)

(*) Notice: Subject to any disclaimer, the term of this patent is extended or adjusted under 35 U.S.C. 154(b) by 0 days.

(21) Appl. No.: 17/244,881

(22) Filed: Apr. 29, 2021

(65) Prior Publication Data
US 2021/0344384 A1    Nov. 4, 2021

Related U.S. Application Data

(60) Provisional application No. 63/017,573, filed on Apr. 29, 2020.

(51) Int. Cl.
*H04B 7/0413* (2017.01)
*H01Q 15/14* (2006.01)

(52) U.S. Cl.
CPC ......... *H04B 7/0413* (2013.01); *H01Q 15/148* (2013.01)

(58) Field of Classification Search
CPC .......................... H01Q 15/148; H04B 7/0413
See application file for complete search history.

(56) References Cited

U.S. PATENT DOCUMENTS

| | | | |
|---|---|---|---|
| 7,599,420 B2 | 10/2009 | Forenza et al. | |
| 2012/0182180 A1* | 7/2012 | Wolf | G01C 5/06 342/357.29 |

OTHER PUBLICATIONS

Wu et al. "beamforming Optimization for wireless Network Aided by Intelligent Reflecting Surface with discrete phase shifts", Mar. 2020, IEEE transactions on communications, vol. 68, No. 3; pp. 1838-1851 (Year: 2020).*
Basar et al. "wireless communications through reconfigurable intelligent surfaces", IEEE access, vol. 7,pp. 116753-116773 (Year: 2019).*
Abari, O. et al., "Cutting the cord in virtual reality," In Proceedings of the 15th ACM Workshop on Hot Topics in Networks. ACM, 162-168, 2016.
Adafruit Bluefruit LE UART Friend—Bluetooth Low Energy (BLE), (available at https://www.adafruit.com/product/2479), 2019.
Agilent. [n.d.]. Network Analyzer Basics, (available at http://anlage.umd.edu/Microwave%20Measurements%20for%20Personal%20Web%20Site/Agilent%20NWA%20Basics%205965-7917E.pdf).
Analog Devices, HMC247 400? Analog Phase Shifter, (available at https://www.analog.com/media/en/ technical-documentation/data-sheets/hmc247.pdf), 2019.
Analog Devices, [n.d.]. HMC7992: Nonreflective, Silicon SP4T Switch, 0.1 GHz to 6.0 GHz (available at https://www.analog.com/media/en/technical-documentation/data-sheets/HMC7992.pdf).

(Continued)

*Primary Examiner* — Rahel Guarino
(74) *Attorney, Agent, or Firm* — Mintz Levin Cohn Ferris Glovsky and Popeo, P.C.

(57) ABSTRACT

In some example embodiments, there may be provided an apparatus. The apparatus may include a surface including at least one electro-magnetic reflective element programmed to provide a plurality of reflected signals, such that the plurality of reflected signals constructively adds at a location of a receiver of the plurality of reflected signals. Related systems, methods, and articles of manufacture are also described.

15 Claims, 6 Drawing Sheets

(56) References Cited

OTHER PUBLICATIONS

Aruba 303 Series Campus Access Points Data Sheet, (available at https://www.arubanetworks.com/assets/ds/DS_AP303Series.pdf), 2019.

Arun, V. et al., RFocus: Practical Beamforming for Small Devices. arXiv:cs.NI/1905.05130, 2019.

Bellalta, B. IEEE 802.11 ax: High-efficiency WLANs. IEEE Wireless Communications 23, 1 (2016), 38-46, 2016.

Bharadia, D. et al., "Backfi: High throughput WiFi backscatter," ACM SIGCOMM Computer Communication Review 45, 4 (2015), 283-296, 2015.

Bharadia, D. et al., "Fastforward: Fast and constructive full duplex relays," ACM SIGCOMM Computer Communication Review 44, 4 (2015), 199-210, 2015.

Bharadia, D. et al., "Full Duplex Backscatter," In Proceedings of the Twelfth ACM Workshop on Hot Topics in Networks. ACM, 4, 2013.

Chan, J. et al., "Surface MIMO: Using Conductive Surfaces For MIMO Between Small Devices," In Proceedings of the 24th Annual International Conference on Mobile Computing and Networking (MobiCom '18). ACM, New York, NY, USA, 3-18, 2018. https://doi.org/10.1145/3241539.3241562.

Chen, H.-T. et al., "A review of meta-surfaces: physics and applications," Reports on progress in physics 79, 7 (2016), 076401.

Cisco Small Business 550/560 Wireless Access Points Data Sheet, (available at https://www.cisco.com/c/en/us/products/collateral/wireless/small-business-500-series-wireless-access-points/data_sheet_c78-727995.html), 2017.

Dash, S. et al., "Wideband Perfect Absorption Polarization Insensitive Reconfigurable Graphene Metasurface for THz Wireless Environment," In 2019 IEEE Microwave Theory and Techniques in Wireless Communications (MTTW), vol. 1. IEEE, 93-96, 2019.

Del Coso, A. et al., "Cooperative distributed MIMO channels in wireless sensor networks," IEEE Journal on Selected Areas in Communications 25, 2 (2007), 402-414.

Díaz-Rubio, A. et al., "From the generalized reflection law to the realization of perfect anomalous reflectors," Science advances 3, 8 (2017), e1602714.

Di Renzo, M. et al., "Smart radio environments empowered by reconfigurable AI meta-surfaces: an idea whose time has come," EURASIP Journal on Wireless Communications and Networking 2019, 1 (2019), 129.

Fridstroem, M. "The bandwidth problem: 5 issues the VR industry must resolve," (available at https://venturebeat.com/2017/05/06/the-bandwidth-problem-5-issues-the-vr-industry- must-resolve/), 2017.

Goldsmith, A. "Wireless communications" Cambridge university press, 2005.

Hamed, E. et al., "Real-time distributed MIMO systems," In SIGCOMM, 2016.

Husmann, C. et al., "FlexCore: Massively Parallel and Flexible Processing for Large {MIMO} Access Points," In 14th {USENIX} Symposium on Networked Systems Design and Implementation ({NSDI} 17). 197-211, 2017.

Iyer, V. et al., "Inter-technology backscatter: Towards internet connectivity for implanted devices," In SIGCOMM, 2016.

Johnson, R.C. et al., "Determination of far-field antenna patterns from near-field measurements," Proc. IEEE 61, 12 (1973), 1668-1694, 1973.

Kellogg, B. et al., "Passive Wi-Fi: Bringing Low Power to Wi-Fi Transmissions," In NSDI, 2016.

Kellogg, B. et al., "Wi-Fi backscatter: Internet connectivity for RF-powered devices," In ACM SIGCOMM Computer Communication Review, 2014.

Kotaru, M. et al., "SpotFi: Decimeter Level Localization Using Wi-Fi," SIGCOMM, 2015.

Li, Z. et al., "Towards Programming the Radio Environment with Large Arrays of Inexpensive Antennas," In 16th USENIX Symposium on Networked Systems Design and Implementation (NSDI 19), 2019.

Liaskos, C. et al., "A novel communication paradigm for high capacity and security via programmable indoor wireless environments in next generation wireless systems," Ad Hoc Networks 87 (2019), 1-16.

Linksys Business Wireless—AC Dual-Band Access Points, (available at http://downloads.linksys.com/downloads/datasheet/en/LAPAC1200_LAPAC1750_English.PDF), 2015.

Linksys AC750 Boost Range Extender, (available at https://www.linksys.com/us/wireless-wi-fi-range-extenders/linksys-re6300-ac750-boost-wifi-extender/p/p-re6300/).

Liu, F. et al., "Intelligent metasurfaces with continuously tunable local surface impedance for multiple reconfigurable functions," Physical Review Applied 11, 4 (2019), 044024.

Nikitopoulos, K. et al., "Geosphere: Consistently turning MIMO capacity into throughput," In ACM SIG-COMM Computer Communication Review, vol. 44. ACM, 631-642, 2014.

Pentland, A. "Smart rooms, smart clothes," In Proceedings. Fourteenth International Conference on Pattern Recognition (Cat. No. 98EX170), vol. 2. IEEE, 949-953, 1998.

Perrakis, G. et al., "Perfect optical absorption with nanostructured metal films: design and experimental demonstration," Optics express 27, 5 (2019), 6842-6850.

Qualcomm Technologies, Inc., VR and AR pushing connectivity limits, (available at https://www.qualcomm.com/media/documents/files/vr-and-ar-pushing-connectivity- limits.pdf), 2018.

Quantenna. [n.d.]. Quantenna QSR10GU 802.11 ac WiFi Card, (available at http://www.quantenna.com).

Schmidt, R. "Multiple emitter location and signal parameter estimation," IEEE Transactions on Antennas and Propagation 34, 3 (Mar. 1986), 276-280.

Sievenpiper, D.F. et al., "Two-dimensional beam steering using an electrically tunable impedance surface," IEEE Transactions on antennas and propagation 51, 10 (2003), 2713-2722.

SkyWorks. [n.d.]. SKY13575-639LF: Dual-Band Matched SP4T Wi-Fi Switch, (available at https://www.skyworksinc.com/-/media/SkyWorks/Documents/Products/2201-2300/SKY13575_639LF_203270D.pdf).

Sur, S. et al., "Practical MU-MIMO user selection on 802.11 ac commodity networks," In Proceedings of the 22nd Annual International Conference on Mobile Computing and Networking. ACM, 122-134, 2016.

Talla, V. et al., "LoRa backscatter: Enabling the vision of ubiquitous connectivity," IMWUT (2017).

Tcvetkova, S.N. et al., "Multi-channel reflectors: Versatile performance experimentally tested," In 2017 11th International Congress on Engineered Materials Platforms for Novel Wave Phenomena (Metamaterials). IEEE, 346-348, 2018.

TP-Link. [n.d.]. RE450 1750 Wi-Fi Range Extender, (available at https://static.tp-link.com/RE450_V1_Datasheet.pdf).

Tsilipakos, O. et al., "Anti-matched electromagnetic metasurfaces for broadband arbitrary phase manipulation in reflection," ACS photonics 5, 3 (2018), 1101-1107.

Tsilipakos, O. et al., "Tunable perfect anomalous reflection in metasurfaces with capacitive lumped elements," In 2018 12th International Congress on Artificial Materials for Novel Wave Phenomena (Metamaterials). IEEE, 392-394, 2018.

UniFi AC APs Datasheet, (available at https://dl.ubnt.com/datasheets/unifi/UniFi_AC_APs_DS.pdf), 2019.

Vasisht, D. et al., "Decimeter-Level Localization with a Single Wi-Fi Access Point," (NSDI) 2016.

Wang, A. et al., "FM Backscatter: Enabling Connected Cities and Smart Fabrics," In NSDI. 243-258, 2017.

Wang, D. et al., "Spectral efficiency of distributed MIMO systems," IEEE Journal on Selected Areas in Communications 31, 10 (2013), 2112-2127.

Wang, S. et al., "Fundamental analysis of full-duplex gains in wireless networks," IEEE/ACM Transactions on Networking 25, 3 (2017), 1401-1416.

Wei, T. et al., "Random access signaling for network MIMO uplink," In IEEE INFOCOM 2016—The 35th Annual IEEE International Conference on Computer Communications. IEEE, 1-9, 2016.

(56) References Cited

OTHER PUBLICATIONS

Welkie, A. et al., "Programmable radio environments for smart spaces," In Proceedings of the 16th ACM Workshop on Hot Topics in Networks. ACM, 36-42, 2017.

Xiong, J. et al., "ArrayTrack: A Fine-Grained Indoor Location System," In Proceedings of the 10th USENIX conference on Networked Systems Design and Implementation (nsdi'13). USENIX Association, Berkeley, CA, USA, 71-84.

Yang, H. et al., "A programmable metasurface with dynamic polarization, scattering and focusing control," Scientific reports 6 (2016), 35692.

Yang, J. et al., "Design of miniaturized dual-band microstrip antenna for WLAN application," Sensors 16, 7 (2016), 983.

Zhang, P. et al., "Hitchhike: Practical backscatter using commodity wifi," In SenSys, 2016.

Zhao, Y. et al., "Improving Amplify-and-Forward Relay Networks: Optimal Power Allocation versus Selection," In 2006 IEEE International Symposium on Information Theory. 1234-1238, 2006.

Zhou, X. et al., "Mirror mirror on the ceiling: Flexible wireless links for data centers," ACM SIGCOMM Computer Communication Review 42, 4 (2012), 443-454.

\* cited by examiner

200

```
┌─────────────────────────────────────────────────────────────────────────┐
│ Smart surface configured with a first predetermined phase shift         │
│ configuration (e.g., zero phase at each of the phase shifter) 202       │
└─────────────────────────────────────────────────────────────────────────┘
                                    │
┌─────────────────────────────────────────────────────────────────────────┐
│ First channel measurement performed on a received first packet with     │
│ smart surface configured in the first predetermined phase shift         │
│ configuration 205                                                       │
└─────────────────────────────────────────────────────────────────────────┘
                                    │
┌─────────────────────────────────────────────────────────────────────────┐
│ Smart surface configured with a second predetermined phase shift        │
│ configuration (e.g., alternating 0 degree and 180 degree phase shifts   │
│ at each of the phase shifter) 210                                       │
└─────────────────────────────────────────────────────────────────────────┘
                                    │
┌─────────────────────────────────────────────────────────────────────────┐
│ Second channel measurement performed on a received second packet with   │
│ smart surface configured in the second predetermined phase shift        │
│ configuration 215                                                       │
└─────────────────────────────────────────────────────────────────────────┘
                                    │
┌─────────────────────────────────────────────────────────────────────────┐
│ Smart surface configured with a third predetermined phase shift         │
│ configuration (e.g., alternating 180 degree and 0 degree phase shifts   │
│ at each of the phase shifter) 220                                       │
└─────────────────────────────────────────────────────────────────────────┘
                                    │
┌─────────────────────────────────────────────────────────────────────────┐
│ Third channel measurement performed on a received third packet with     │
│ smart surface configured in the third predetermined phase shift         │
│ configuration 222                                                       │
└─────────────────────────────────────────────────────────────────────────┘
                                    │
┌─────────────────────────────────────────────────────────────────────────┐
│ Determine optimum phase shift value based on the three channel          │
│ measurements 225                                                        │
└─────────────────────────────────────────────────────────────────────────┘
                                    │
┌─────────────────────────────────────────────────────────────────────────┐
│ Provide the determined optimum phase shift value to the smart surface   │
│ 230                                                                     │
└─────────────────────────────────────────────────────────────────────────┘
```

FIG. 2

VIRTUAL MIMO WITH SMART SURFACES

CROSS-REFERENCE TO RELATED APPLICATIONS

This application claims priority to provisional U.S. application Ser. No. 63/017,573, entitled "ScatterMIMO: Enabling Virtual MIMO with Smart Surfaces" and filed Apr. 29, 2020, the contents of which is hereby incorporated by reference in its entirety.

BACKGROUND

In radio technology, multiple input multiple output (MIMO) refers to the use of multiple transmitters and multiple receivers to transfer data. MIMO can be used in cellular, satellite communications, wireless local area networks, and other radio technologies to increase throughput. MIMO takes advantage of multipath causing RF signals from different paths to reach the receiver at different times and from different directions. MIMO can be used to combine the data streams carried by the different paths to, as noted, increase overall throughput.

SUMMARY

In some example embodiments, there may be provided an apparatus. The apparatus may include a surface including at least one electro-magnetic reflective element programmed to provide a plurality of reflected signals, such that the plurality of reflected signals constructively adds at a location of a receiver of the plurality of reflected signals.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to optical edge detection, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 depicts an example of a process for determining a phase configuration for the smart antenna surface, in accordance with some example embodiments;

DETAILED DESCRIPTION

Multiple input multiple output (MIMO) technology may be considered a core technology in many wireless systems, such as satellite communication systems, cellular, wireless local area networks, and the like. To illustrate further in the context of wireless local area networks and in particular Wi-Fi, the IEEE 802.11ac standard (which was released in 2011) specifies a peak data rate of 4.33 gigabit per second (Gbps) using a 4 by 4 MIMO. But years later, it is very rare to see Wi-Fi connections achieving this performance. Even with densely deployed Wi-Fi APs, devices still suffer from poor throughput while being well within a coverage area. A reason for this poor performance is the lack of multiple strong paths in the radio frequency (RF) environment. For example, a user equipment (e.g., a smart phone, a tablet, a wireless IoT device, a processor based device coupled to a wireless transceiver, and/or the like) observes a single dominant RF path, while the other RF paths may be about 10 to 20 dB weaker. As such, the MIMO spatial multiplexing gain or diversity gain is lower due to this lack of additional RF signal paths. Spatial multiplexing gain refers to an increase in overall throughput or capacity provided by the spatial streams of the MIMO channels. This capacity gain may be realized even without increasing channel power or increasing channel bandwidth. The independent data stream signals from individual antennas from the a MIMO wireless access point enables the receiver separately receive and decode these streams to provide the spatial multiplexing gain.

In some example embodiments, there is provided a smart surface (which may also referred to herein as a "surface" or a "smart antenna surface") that receives a first RF stream (e.g., an RF signal path transmitted by a transmitter such as a Wi-Fi access point). This smart surface is configured (e.g., programmed) to generate and transmit a plurality of additional RF streams (e.g., reflected RF signal paths). The smart surface includes a plurality of antennas and a plurality of programmable phase shifters that enable the additional reflected streams to be generated and transmitted, such that these additional streams constructively add at a location of the receiver, such as a user equipment. In this way, these additional streams may be received at the receiver with at least the same or similar power as the direct RF signal path (e.g., the main or non-reflected, direct stream) stream transmitted by the transmitter such as the Wi-Fi access point. The surface may be considered "smart" in the sense that the surface is configurable.

Figure 1:
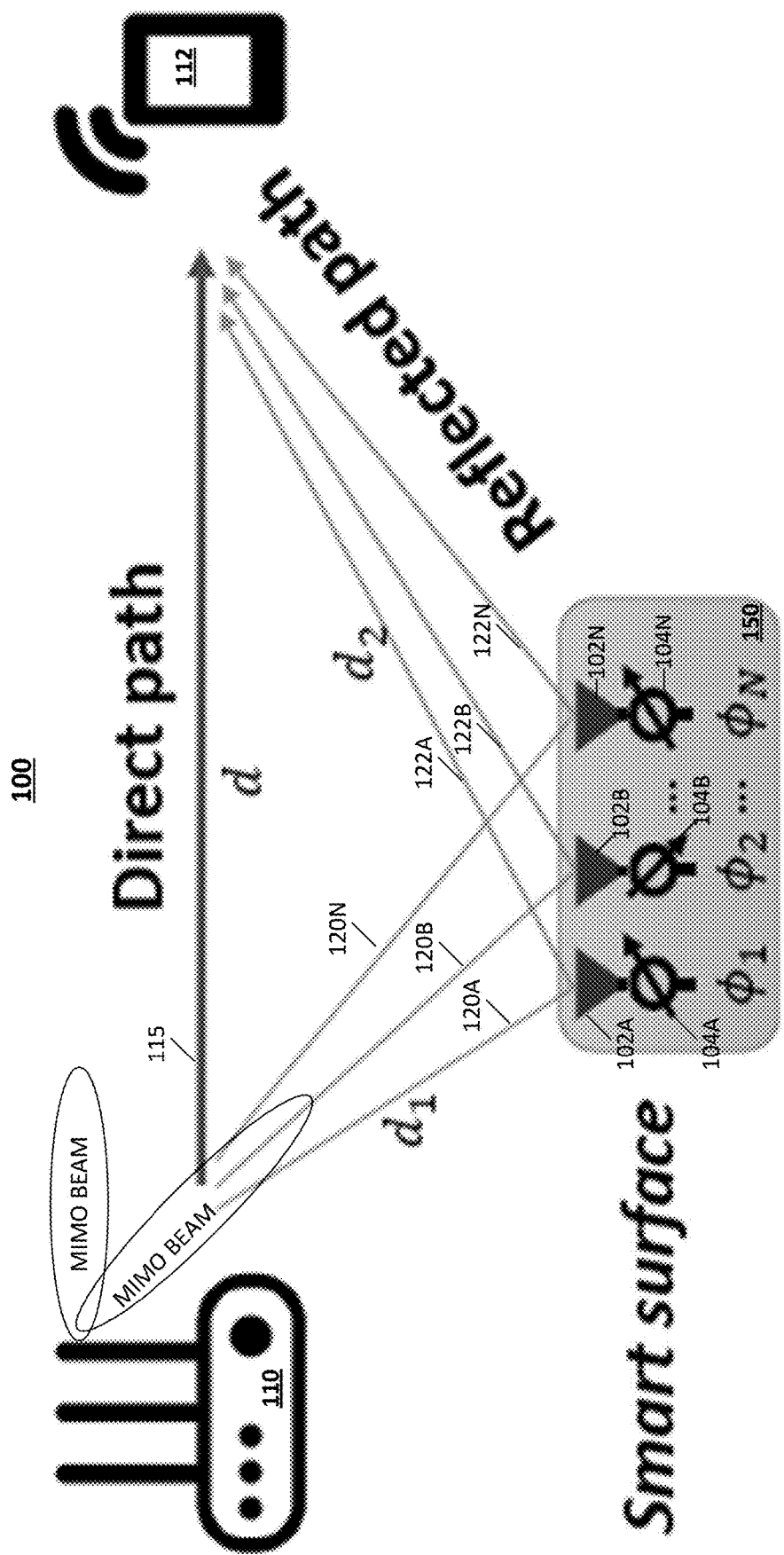
FIG. 1 depicts an example of a system including a smart antenna surface, in accordance with some example embodiments.

FIG. 1 depicts an example of a system 100 including a wireless access point 110, such as a Wi-Fi access point for a wireless local area network, a user equipment 112, and a smart surface 150, in accordance with some example embodiments. In the example of FIG. 1, the wireless access point 110 transmits via a direct RF path 115 towards the user equipment and via one or more additional RF paths labeled 120A-N. Although some of the examples refer to Wi-Fi and wireless local area networks, the smart surface disclosed herein may be used with other radio technologies as well. In the case of cellular for example, the access point 110 may comprise a cellular base station operating with the smart surface 150.

The smart surface 150 may include at least one antenna, such as antennas 102A, 102B, and 102N, and at least one phase shifter, such as phase shifters 104A-N. The smart surface may be configurable in the sense that the phase shifter(s) may be programmed (e.g., configured, controlled, etc.) to induce an additional phase (e.g., delay), such as Ø1, Ø2, and ØN, at each of the antennas 102A-N. In this way, the reflected paths 122A-C transmitted by each of the antennas 102A-N add constructively at the receiver, such as the user equipment 112. The constructively added reflected signals 122A-N may provide, at the receiver such as user equipment 112, signal-to-noise improvements. Alternatively, or additionally, the constructively added reflected signals may provide, at the receiver (e.g., UE 112) spatial multiplexing gains via the direct path 115 (which provides a first spatial stream) and by the constructively added reflected signals 122A-N (which provides a second spatial stream).

In a sense, the smart surface 150 may be considered a "virtual" access point (AP) as the reflected path RF signals 122A-N (which constructively add) may provide the same or similar power as the MIMO beam for the direct path 115. As such, the constructively added reflected signals 122A-N may improve the receiver's performance as a result of the spatial multiplexing gains provided by MIMO.

The antennas 102A-N may each comprise one or more antennas (e.g., elements, such as electro-magnetic reflective elements). Although FIG. 1 depicts a plurality of antennas 102A-N, the system 100 may include other quantities of antennas (e.g., the smart surface may include a single antenna). For example, the antenna may be implemented using meta-materials, a patch antenna, and/or other types of reflective elements.

The smart surface 150 may, as noted, be configured to generate a controlled and directional reflected path(s) 122A-N for the user equipment 112. These reflected paths 122A-N may, as noted, constructively add at the location of the receiver to provide a signal strength that is at least similar to the signal strength of the direct MIMO beam path signal 115. For example, each of the smart surface 150 antennas 102A-N may apply an extra delay (e.g., a phase shift) with the corresponding phase shifters 104A-N (which are programmable) so that the phases match at the location of the receiver, such as user equipment 112. As used herein, the phrase "phase shifter" refers to a programmable (e.g., controllable) device that provides a phase shift in an RF signal. The phase shifter may be implemented based on one or more delay lines, wherein each delay line is a transmission line providing a given predetermined delay and thus a phase shift to the RF signal. Other types of phase shifters include reactor diodes (which provide programmable phase shift by changing capacitance upon varying the voltage applied across the varactor diode). In the context of the reflected signals, constructive addition refers to the reflected signals adding in magnitude, such that the combined magnitude is greater than the magnitude of the individual reflected signals.

In some implementations of the smart surface 150, the surface 150 may be a passive smart surface in the sense that amplifiers are not included on the smart surface to amplify the transmitted or reflected RF signals at 122A-N. In some implementations, the use of a passive smart surface (e.g., without one or more amplifiers at 102A-N to amplify the reflected RF signals) reduces the power consumption of the smart surface.

In the example of FIG. 1, the wireless access point 110 may transmit a direct path signal 115 towards the user equipment 112. There are also reflected path signals 120A-N that are received (e.g., absorbed) at the smart surface 150 and then transmitted (e.g., re-radiated or reflected) at 122A-N. In the example of FIG. 1, the reflected signal path 120-122 suffers from near-field attenuation twice. But having a large quantity of antennas on the smart surface 150 may combat this attenuation loss by having the reflected signals add constructively at the receiver, such as user equipment 112. The quantity (or number) of antennas at the smart surface may vary depending on the distances between the wireless access point 110, the smart surface 150, and the user equipment 112. But under some (if not all) wireless local area network conditions, the smart surface may include fewer than about 50 antennas, for example. And, these 50 antennas may be packed within a 30 cm×10 cm area as a two-dimensional 5-GHz antenna array, for example. And, the depth of this array may be on less the 0.3 cm, so the smart surface may be placed in a variety of areas (e.g., behind a painting, on a coffee table, etc.) to enhance user equipment reception.

Although the phase shifters 104A-N may be programmed to provide a phase shift to each of the reflected signals 122A-N so they add constructively at the receiving user equipment 112, the user equipment may not be stationary but rather in a mobile state so its location may change from time to time. As the phase shift depends on the location of at least the user equipment 112, the phase configuration (e.g., the setting of the phase shifters 104A-N) of the smart surface 150 may need to be determined from time to time so that the proper phase shift is configured to enable the reflected signals 122A-N to be constructively added at the user equipment.

In some example embodiments, there is provided a way to determine the phase configuration information to be programmed at the phase shifters 104A-N of the smart surface 150.

In some example embodiments, the phase configuration of the smart surface 150 may be determined based on at least 3 channel measurements by applying 3 predetermined smart surface configurations and decomposing the channel responses to determine the phase offset for the smart surface. For example, the user equipment 112 may transmit a first packet with a first predetermined phase configuration at the smart surface, transmit a second packet with a second predetermined phase configuration at the smart surface, and then transmit a third packet with a third predetermined phase configuration at the smart surface. The wireless access point may determine the channel response (e.g., channel state) based on the direct path and the reflected paths from the smart surface (which varies it phase configuration for each packet transmission). From the channel response measurements on the uplink, the wireless access point may determine the phase configuration of the smart surface. The wireless access point may then provide the phase configuration to the smart surface to configure the phase shifters 104A-N. At this stage, when the wireless access point 110 transmits a downlink towards the user equipment 112, the reflected path signals 122A-N add constructively at the receiver, such as user equipment 112. Likewise, the user equipment's uplink may take advantage of the smart surface as well for its uplink towards the wireless access point.

Although some of the examples described herein refer to the direct path and reflected paths in the downlink direction towards the user equipment 112, the smart surface 150 may be used to provide uplink support to the user equipment (UE) as well. For example, the direct path and reflected paths shown at FIG. 1 may be for an uplink transmission from the UE towards the access point 110. Moreover, when the smart surface is optimized (e.g., provides reflected path signals 122A-N that constructively add at the location of the receiver, UE 112) for the downlink towards the UE as described in some of the examples herein, the smart surface may be considered optimized for the access point as well (in which case, the smart surface receives incident signals 120A-N from the UE and transmits reflected path signals 122A-N towards the access point 110).

FIG. 2 depicts an example of a process 200 for determining the phase configuration for the smart surface such that the reflected signals 122A-N constructively add at a location of the receiver, such as user equipment 112, in accordance with some example embodiments. Although the process determines the phase configuration so constrictive addition is achieved at the location of the receiver, the process does not need to know the position or geolocation of the receiver, such as UE 112.

At 202, the smart surface 150 is configured to have a first predetermined phase configuration, such as a zero degree phase shift at each of the antenna elements 102A-N. For example, the wireless access point 110 (or the user equipment 112) may request the smart surface to configure the phase shifters 104A-N to provide the zero phase shift (e.g., zero delay or phase shift at each of the phase shifters).

At 205, a first channel measurement is performed. For example, the user equipment 112 may transmit a first packet, which is received at the wireless access point 110 via the direct path 115 and the reflected path(s) 120-122 (which reflected from the first predetermined smart surface configuration of 202). The wireless access point may, based on the received packet, perform an estimate of the channel state (e.g., channel measurement) of the direct path and the reflected path(s) with the smart surface configured with zero phase shift. For example, the channel measurement may provide a first channel response, $H_1$, to be determined.

At 210, the smart surface 150 is configured to have a second predetermined phase configuration, such as an alternating 0 degree and 180 degree phase shifts across the antenna elements 102A-N. For example, the first phase shifter 104A may have a 0 degree phase shift, the second phase shifter 104B may have a 180 degree phase shift, the third phase shifter 0 degrees, and so forth with the repeating alternating pattern of 0 degree and 180 through the phase shifters. As in 202, the wireless access point 110 (or the user equipment 112) may request the smart surface to configure the phase shifters 104A-N to provide the second predetermined phase configuration.

At 215, a second channel measurement is performed. For example, the user equipment 112 may transmit a second packet, which is received at the wireless access point via the direct path 115 and the reflected path(s) 120-122 (which reflected from the second predetermined smart surface configuration of 210). The wireless access point may, based on the received second packet, perform an estimate of the channel state of the direct and reflected path signals with the smart surface configured with alternating 0 and 180 degree phase shift. This allows a second channel response, $H_2$, to be determined.

At 220, the smart surface is configured to have a third predetermined phase configuration, such as alternating 180 degree and 0 degree phase shifts at the antenna elements 102A-N. For example, the first phase shifter 104A may have a 180 degree phase shift, the second phase shifter 104B may have a 0 degree phase shift, the third phase shifter 180 degrees, and so forth with the repeating alternating pattern of 180 degree and 0 through the phase shifters. As in 202 and 215, the wireless access point 110 (or the user equipment 112) may request the smart surface to configure the phase shifters 104A-N to provide the third predetermined phase configuration.

At 222, third second channel measurement is performed. For example, the user equipment 112 may transmit a third packet, which is received at the wireless access point via the direct path 115 and the reflected path(s) 120-122 (which reflected from the third predetermined smart surface configuration of 220). The wireless access point may, based on the received third packet, perform an estimate of the channel state of the direct and reflected path signals with the smart surface configured with alternating 180 and 0 degree phase shift. This allows a third channel response, $H_3$, to be determined.

At 225, an optimal phase shift value is determined based on the three channel responses, $H_1$, $H_2$, and $H_3$. For example, the wireless access point 110 may, based on the three determined channel responses, $H_1$, $H_2$, and $H_3$, may determine $\alpha$ (alpha). Additional details for determining $\alpha$ (alpha) from the responses ($H_1$, $H_2$, and $H_3$) are provided below.

At 230, the optimal phase value $\alpha$ (alpha) may then be provided (e.g., sent) to the smart surface to program the phase shifters at the smart surface. For example, the wireless access point 110 may provide (send via a wired or wireless link) the determined a (alpha) to the smart surface 150 to enable the smart surface to configure the phase shifters. Alternatively, or additionally, the access point 110 may provide to the smart surface other configuration information including delay values to program the surface 150 to apply the delay values to the reflected signals 122A-N. Alternatively, or additionally, the other configuration information may include amplitude values to program the surface 150 to apply the reflected signals 122A-N. For example, an antenna 102B may have an attenuation applied by programming an attenuator coupled to the antenna 102B. In some embodiments, the surface 150 may be configured to change the configuration of the polarization of at least one of the plurality of reflected signals 122A-B. This may also provide optimization at the receiver in terms of signal-to-noise ratio, data rate, and/or spatial multiplexing gain. For example, each of the antennas 102A-N may be coupled to a polarizer to configured the polarization of the corresponding reflected signal 122A-N. And, the polarization change may be configured via a controller, such as controller 620 (described below with respect to FIG. 6).

Although the example above describes the wireless access point 110 (or the user equipment 112) requesting the smart surface to configure the phase shifters, the phase shifter may include a controller that may control the different phase configurations. Alternatively, or additionally, the smart surface may trigger (or instruct) the user equipment to transmit the three packets (e.g., at certain times) and/or trigger (or instruct) the wireless access point to perform the measurements (which can be used to determine the optimum phase). Alternatively, or additionally, the optimum phase determination at 225 may be determined by the user equipment or a controller at the smart surface (e.g., based on measurements provided by the wireless access point).

In some embodiments, the process 200 provides an optimal phase value α (alpha), and the smart surface 150 may be programmed such that the reflected signals combine constructively at a location of the receiver, such as the user equipment 112. In some embodiments, the smart surface may also adjust the power of the reflected path signals 122A-B. For example, an attenuator may be configured at each of the plurality of antennas to adjust the transmitted power at each plurality of antennas. To illustrate further with the example of MIMO at the wireless access point 110, the optimum surface configuration may include varying the amplitude at one or more of the antennas 102A-N to optimize MIMO data rate at the receiver.

Although some of the examples optimize signal strength at the receiver, the optimizations may be in terms of increased data rate and MIMO rank optimization as well. For example, the surface may be configured (e.g., with a change in a phase shift, a delay, and/or an amplitude/attenuation) to provide at the receiver an optimized signal strength, data rate, or MIMO rank maximization.

Referring again to the reflected path 120-122 at FIG. 1, the power of the reflected signal path may be determined. The user equipment's 112 location may be known, and the smart surface 150 may reflect signals 122A-N in any desired direction with negligible internal loss. The distance, $d_1$, corresponds to the distance between the wireless access point 110 and the smart surface; the distance, $d_2$, is the distance between the smart surface and the user equipment; and the distance, $d_1$, is the distance of the direct path.

By applying the Friis equation, the direct path 115 power is as follows:

$$P_R = P_T \frac{G_T G_R \lambda^2}{(4\pi d)^2} \quad (1)$$

where $P_R$ is the power received by the client, $P_T$ is the power transmitted by the wireless access point, $G_T$, $G_R$ are the antenna gains of the wireless access point and the user equipment, respectively, $\lambda$ is the wavelength, and d is the distance between the transmitter and the receiver with the assumption that omnidirectional antennas are used, so $G_T$ and $G_R$ do not change across directions (although other antenna types may be used). Although in this example, the wireless access point is the transmitter and the receiver is the user equipment 112, those roles may be reversed and the smart surface would still operate as disclosed herein.

For the reflected path 120-122, the same process happens twice (before and after reflection), hence we have:

$$P'_R = \left[ P_T \frac{G_T G_r \lambda^2}{(4\pi d_1)^2} \right] \frac{G_r G_R \lambda^2}{(4\pi d_2)^2} = P_T \frac{G_T G_r^2 G_R \lambda^4}{(16\pi^2 d_1 d_2)^2} \quad (2)$$

where Gr is the antenna gain of a single reflecting antenna, which also captures the internal losses of the smart surface 150.

With a plurality of N quantity antennas 102A-N on the smart surface 150, the smart surface can change the phase of the reflected signal paths 122A-N. And, the reflected paths 122A-N may be phase-matched using the phase shifters 104A-N, so that the amplitudes of the reflected signals paths 122A-N add up constructively at the location of the user equipment 112. Assume, that the smart surface is relatively small and the variation in $d_1$ and $d_2$ across antennas are negligible. The total power of the reflected paths may become $N^2$ times stronger due to the use of the additional antennas 102A-N at the smart surface as shown by the following equation:

$$\Sigma P'_R = N^2 P_T \frac{G_T G_r^2 G_R \lambda^4}{(16\pi^2 d_1 d_2)^2} \quad (3)$$

The ratio between the power of the direct path 115 and the reflected path 120-122 is:

$$\frac{\Sigma P'_R}{P_R} = \left( \frac{N G_r \lambda d}{4\pi d_1 d_2} \right)^2 \quad (4)$$

Given channel conditions (e.g., $\lambda$, $d_1$, $d_2$, d) and antenna gain $G_r$ of the smart surface 150, the ratio of Equation (4) may be manipulated by varying N. To make this ratio close to 1 for example, the MIMO receiver (which in this example is user equipment 112) may obtain a better signal-to-noise ratio for all the streams 115 and 120A-N/122A-N (which constructively add at the receiver), when compared to the case where the reflected signals that do not constructively add at the receiver.

The phase configuration (e.g., the setting of the phase shifters 104A-N) of the smart surface 150 may need to be determined from time to time as the user equipment 112 moves, for example. In other words, the optimal phase shift configuration for the phase shifters 104A-N depends on the location of the user equipment, so that all of the reflected signal paths 122A-N arrive at the user equipment with the similar or same phase to enable constructive addition. In some embodiments, the phase configuration value(s) may be determined in real time as the user equipment is in a mobile state (e.g., moving).

The phase values for the phase shifters 104A-N may be derived from the location of the user equipment as the location of the wireless access point 110 and the smart surface 150 may be fixed and/or known. But reasonable phase accuracy may dictate the use of sub-centimeter-level localization of the user equipment 112, which may not be reliably obtainable. Alternatively, different phase shift values may be used in a trial-and-error approach by configuring the smart surface and letting the wireless access point to receive a packet from the user equipment to check how well a given phase shift values works. But this trial-and-error approach may not be practical given a smart surface containing an N quantity of antennas equipped with 2-bit phase shifters as there are 4 time N possible phase configurations to check. Thus, in some embodiments, there is provided a way, as noted above with respect to FIG. 2, to determine the optimal phase value α (alpha). As noted above with respect to FIG. 2, three channel measurements may be performed using three different pre-determined phase configuration at the smart surface to derive the optimal phase.

Figure 3:
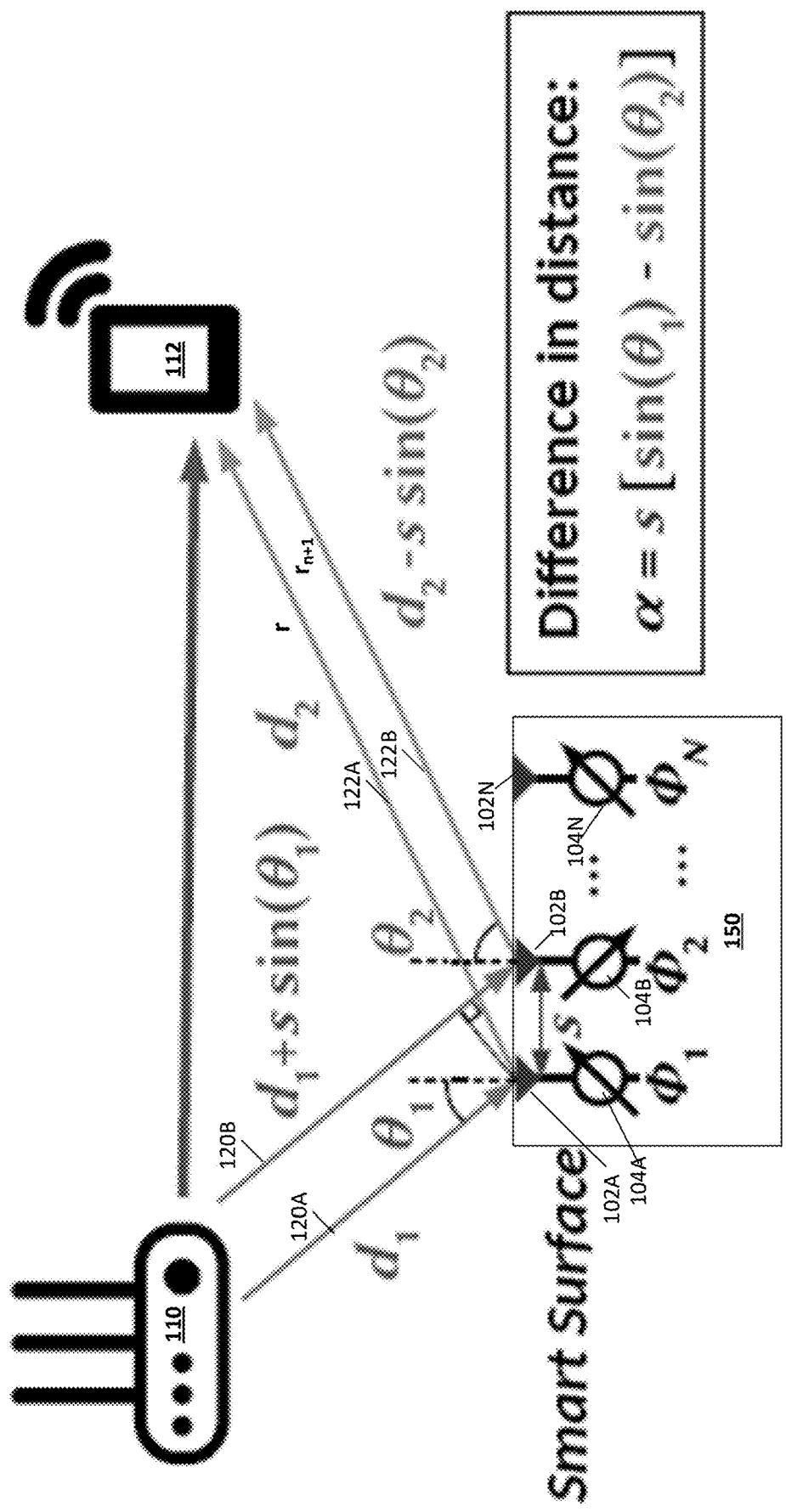
FIG. 3 depicts another example of a system including a smart antenna surface, in accordance with some example embodiments.

FIG. 3 depicts the system 100 but further show the geometry associated with the received reflected path signals 120A-B and the transmitted reflected path signals 122A-B. In the example of FIG. 3, the far-field condition (e.g., the size of the smart surface is much smaller than the distance between the smart surface and the wireless access point or the user equipment) is assumed for the sake of simplifying the explanation. The different reflected paths 122 can be seen traveling parallel to each other. The incidental angle and the reflection angle are denoted as $\theta_1$ and $\theta_2$, respectively. And, s is the distance separating 2 adjacent antennas. In the example of FIG. 3, the distance "s" between adjacent elements (e.g., 102A-B) is the same (which simplifies the phase configuration of the phase shifters, although the distance "s" may be implemented to be different between adjacent phase shifter as well.

When there is no additional phase shift added to the reflected signals 122A-B, the total path length $r_n$ for the $n^{th}$ antenna and, $r_{n+1}$ for the ($n^{th}+1$) antenna, and their path length difference $\alpha$ are:

$$r_n = d_1 + d_2 \, r_{n+1} = [d_1 + s\,\sin(\theta_1)] + [d_2 - s\,\sin(\theta_2)] \alpha = r_{n+1} -$$
$$r_n = s[\sin(\theta_1) - \sin(\theta_2)] \quad (6)$$

Equation (6) shows that s and $\theta_1$ are the properties of the smart surface 150 and, as such, fixed and/or known. And, the $\alpha$ (alpha) value (which represents the path length difference between the $n^{th}$ antenna and the ($n^{th}+1$) antenna) may depend on the reflection angle $\theta_2$. In other words, if the reflection angle $\theta_2$ is determined, the path length difference (and thus the delay or phase difference) may be determined. The following provides a description of the $\alpha$ (alpha) value translates to correct phase shift values for the phase shifters.

To make the signals reflected from each antenna 122A-B add constructively, the phases received at the user equipment 112 need to be the same (or similar). In other words, the difference in the path lengths should be an integer multiple of the wavelength. However, $\alpha$ (alpha) does not necessarily satisfy this condition as the value of $\theta_2$ is arbitrary (e.g., $\theta_2$ depends on the location of the user equipment). The additional phase shift $\phi_n$ introduced by the phase shifter of the smart surface corrects $\alpha$ (alpha), so $\alpha$ (alpha) becomes an integer multiple of wavelength $\lambda$ as shown by the following:

$$\alpha + \lambda \frac{\phi_{n+1} - \phi_n}{2\pi} = K\lambda \quad (7)$$

where $\phi_n$ is the additional round-trip phase-shift added by the $n^{th}$ antenna element, and K is an integer that satisfies the equation. Let $\Delta\phi = \phi_{n+1} - \phi_n$ and rearrange Equation (7), the following results:

$$\Delta\phi = \frac{2\pi}{\lambda}(K\lambda - \alpha) \quad (8)$$

As long as $\Delta\phi$ satisfies Equation (8), the lengths of all the reflected paths (e.g., 122A-B and so forth) will differ by multiples of wavelengths, so the phase at the user equipment will be the same and the signal amplitude will add up constructively. To derive the phase difference $\Delta\phi$ between antenna elements, the value of $\Delta$ (alpha) is the only parameter that is unknown and, as such, must be determined (as the other parameters of Equation (8) are known). The optimal value for phase shift $\phi_n$ of antenna n may be determined as follows:

$$\phi_n = \phi_0 + n\Delta\phi = \phi_0 + \frac{2\pi}{\lambda} n(K\lambda - \alpha) \quad (9)$$

where $\Delta_0$ is an arbitrary phase offset that does not affect constructive combination, and K is an arbitrary integer, which can be set to any value to meet the range of the phase shifter. Thus, the phase shifts configured at each phase shifter depend on the estimated value of $\alpha$ (alpha) to achieve constructive interference (e.g., addition of the reflected signals at the location of the receiver, such as UE 112).

As noted, one channel measurement may not be sufficient to determine $\alpha$ (alpha) as the wireless access point may always receive a direct signal from the user equipment along with the reflected signals from the smart surface as follows:

$$H_{r,n} = |H_{d1}||H_{d2}|e^{-j\phi_n}e^{-jk(d_1+d_2+n\alpha)}$$

$$H = _d + \Sigma_{n \in \{1, \ldots, N\}} H_{r,n} \quad (10)$$

where H is the overall channel observed by the wireless access point, $H_d$ is the channel of the direct path, $H_{r,n}$ is the reflected channel between the wireless access point and the user equipment via smart surface's antenna n, $k = 2\pi/\lambda$, (wavenumber), while $|H_{d1}|$ and $|H_{d2}|$ represents the path-loss of the signal from the wireless access point to the smart surface and from the smart surface to the user equipment, respectively (assuming path-loss caused by a is negligible due to far-field condition).

Referring to Equation (1) above, the reflected channel may be "extracted" via differential measurements by, for example, varying the phase configuration on the smart surface and then measure the overall channel response H, while keeping the direct-path channel the same across the differential measurements. FIG. 2 above depicts an example of a process 200 for determining $\alpha$ (alpha) using three channel measurements. The following provides additional details regarding the process 200.

In the following example, a quantity of 4 (N=antennas) are used at the smart surface 150 to facilitate the explanation (although other antenna quantities may be used as well). The user equipment 112 transmits via an uplink towards the wireless access point 110 three transmissions of, for example, packets, while the wireless access point 110 measures, based on at least the 3 packet transmissions, the respective channel response, $H_1$, $H_2$ and $H_3$, for each packet.

In the first packet, all the antenna phases are set to $\phi_n = 0$, so the baseline channel induced by the smart surface is measured. For the second packet, the phase shift $\phi_n$ of each antenna is alternated between 0 and 180 degrees ($\pi$), which is represented as follows:

$$e^{-j\phi_n} = +1, \forall n \in \text{even} \quad e^{-j\phi_n} = -1, \forall n \in \text{odd}$$

For the third packet, the phase shift $\phi_n$ of each antenna is alternated between 180 degrees ($\pi$ radians) and 0, which is represented as follows:

$$e^{-j\phi_n} = -1, \forall n \in \text{even} \quad e^{-j\phi_n} = +1, \forall n \in \text{odd}$$

The wireless access point 110 may determine the estimated channel response, $H_1$, $H_2$ and $H_3$ as follows:

$$H_1 = H_d + |H_{d1}||H_{d2}|(1 + e^{-jk\alpha} + e^{-2jk\alpha} + \ldots)e^{-jk(d_1+d_2)}$$

$$H_2 = H_d + |H_{d1}||H_{d2}|(1 - e^{-jk\alpha} + e^{2jk\alpha} - \ldots)e^{-jk(d_1+d_2)}$$

$$H_3 = H_d + |H_{d1}||H_{d2}|(-1 + e^{-jk\alpha} - e^{-2jk\alpha} + \ldots)e^{-jk(d_1+d_2)} \quad (11)$$

The wireless access point 110 may subtract channel estimates from each 2 packets, resulting:

$$H_1 - H_2 = 2|H_{d1}||H_{d2}|e^{-jk(d_1+d_2)}\Sigma_{\forall n \in odd} e^{-njk\alpha}$$

$$H_1 - H_3 = 2|H_{d1}||H_{d2}|e^{-jk(d_1+d_2)}\Sigma_{\forall n \in even} e^{-njk\alpha} \quad (12)$$

And, then the angle of $(H_1-H_3)(H_1-H_2)^*$ may be determined:

$$\angle[(H_1 - H_3)(H_1 - H_2)^*] = k\alpha = \frac{2\pi}{\lambda}\alpha \quad (13)$$

given that channel responses $H_d$ and path-loss $|\check{H}|=|H_{d1}||H_{d2}|$ remains constant for the three packets. In other words, the two subtractions may be conjugate multiplied to derive a (alpha) with just 3 packets.

In some instances, the three packet measurements described with respect to FIG. 2 may not be sufficient to determine the value of the optimal phase value α (alpha) due to, for example, synchronization or clock differences between the transmitter and receiver. In the case of Wi-Fi for example, this may cause, at the receiver, random packet detection delay and random phase offsets when detecting the 3 packet transmissions noted above. Although some of the examples refer to performing 3 measurements using 3 transmission, in some implementations additional measurements on additional transmissions may be performed to remove some of the uncertainties, such as noise associated to the clocks at the transmitter and/or receiver and other types of uncertainties.

To correct for this uncertainty, additional measurements (or processing) may be performed to reduce, or eliminate, this uncertain caused by for example timing differences between transmitter and receiver, clock differences between transmitter and receiver, and/or other uncertainties (e.g., noise, randomness, etc.) introduced by the transmitter and receiver. For example, at a fourth measurement may be performed, in accordance with some example embodiments to eliminate these random distortions. This elimination may be based on the phase of the direct path, such direct path 115 whose phase offset should remain constant across the 3 measurements noted above. Once the direct path and reflected path are separated for example, the phase offset may be compensated for by correcting the direct path phase to the same value. In order to separate the direct path from the composite channel (which includes the direct path and the reflected path), the direct path arrives at the wireless access point before the reflected path. This time of arrival property may be used to separate the direct path from the composite channel and match the random phase offsets and sampling time offsets across the 3 pre-determined smart surface configuration transmissions (e.g., packet transmissions). The following describes a process for eliminating these and other distortions which may be present in the radio's hardware.

As noted, the α (alpha) measurement relies on the ability to cancel the channel response while changing the phase configuration on the smart surface. However, an inherent assumption made was that the transmitter and the receiver clocks are synchronized for such cancellation to work. In real world deployments however, the transmitter and the receiver may not be synchronized and may have carrier frequency offset and sampling frequency offsets, which may lead to variation in both the phase detection delay and packet detection delay (sampling time offset) from packet to packet. The phase offset and sampling time offset for the measured channel $H_{measured}$ can be written as:

$$H_{Measured}(f) = e^{(j\phi_e - j2\pi f \tau_e)} H_{True}(f) = e^{j\beta(f)} H_{True}(f)$$

where $H_{true}$, represents the underlying channel, $\phi_e$, and $\tau_e$ represents the phase offset and the sampling time offset, which are represented in a single variable β(f), f represents the sub-carriers of the OFDM system found in Wi-Fi, for example. The error caused by both the effects leads to an additional phase error for each sub-carrier and changes with each of the three measurement packets noted above with respect to FIG. 2, for example. Even if the underlying channel is the same, the estimated channel for two consecutive packets would have different phase error as the phase offset and sampling time offset (which is somewhat random at the receiver) would be different from packet to packet. In other words, even if we subtracted them, they wouldn't cancel each other.

The variation in the phase detection delay and packet detection delay may, as noted, render the channel subtraction ineffective at learning α (alpha). The two channels with two different configurations of smart surface are measured and then subtracted, with the goal that direct path would cancel out, and the leftover channel would be the relative reflected signal from two configurations. The relative reflected signal for special configurations leads to the estimate a (alpha). Specifically, the relative reflected signal may be measured from the entire process of the cancellation. Mathematically shown as follows:

$$H1_{measured} = e^{j\beta_1(f)} H1_{true} = e^{j\beta_1(f)}(H_{direct} + H1_{refl})$$

$$H2_{measured} = e^{j\beta_2(f)} H2_{true} = e^{j\beta_2(f)}(H_{direct} + H2_{refl})$$

The direct path does not, however, change for the channel measurement of all three packets with the smart surface in the three pre-determined phase shifter configurations noted above with respect to FIG. 2. Both the direct path and reflected signal path from the smart surface 150 undergo the randomness (e.g., due to the randomness or unsynchronized nature of the receiver and transmitter causing the phase detection and packet detection offsets). As such, if the phase error for all three pre-determined phase shift channels match, they can be canceled to achieve the relative reflected signal. The channel corresponding to the direct path 115 may be used to align the phase error for all 3 packet channels. Specifically, if $\beta_1(f) = \beta_2(f)$ is matched, the cancellation among the channels noted above can be achieved.

Figure 4:
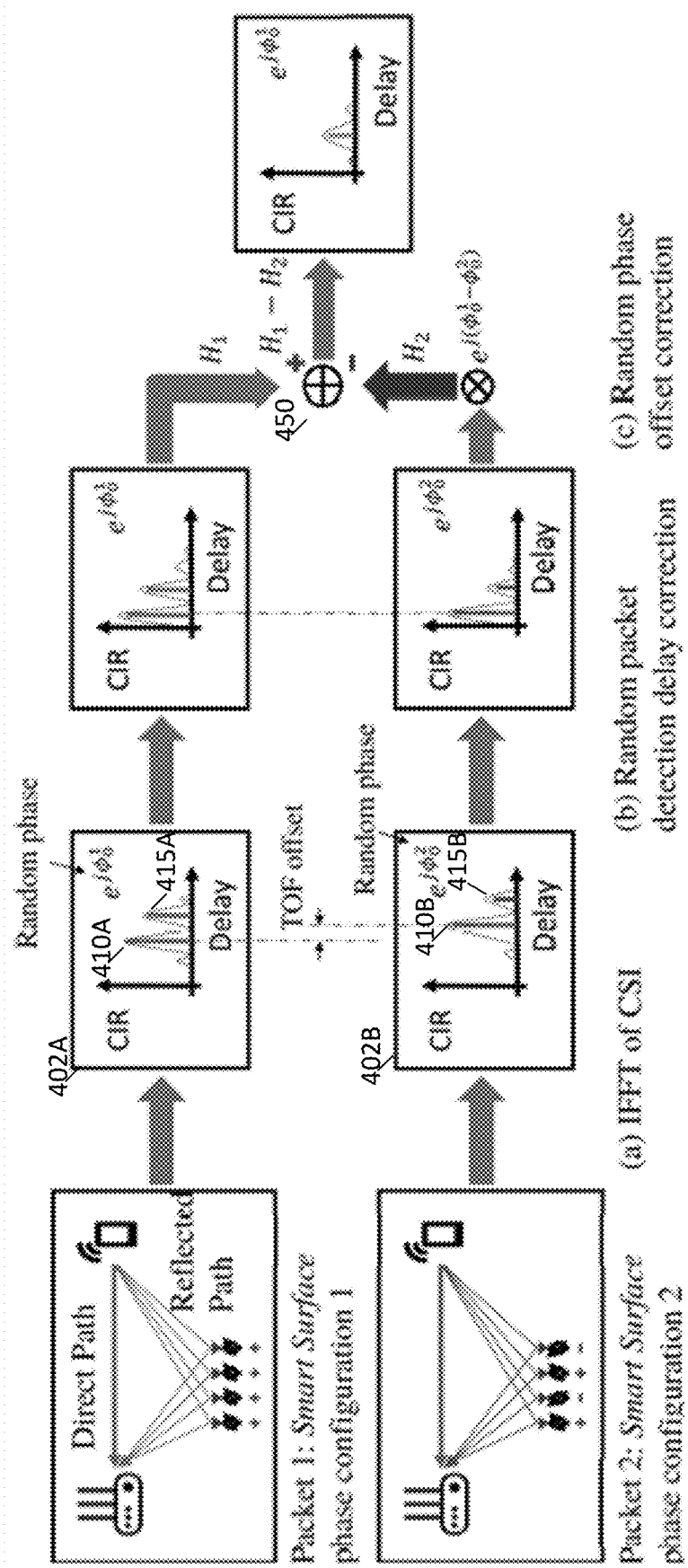
FIGS. 4 and 5 depict processes for compensating for packet detection delay and carrier phase offset in one-dimension and two-dimensions, respectively, in accordance with some example embodiments.

FIG. 4 depicts the processes for removing the randomness (or phase drift) noted above in 1-D, in accordance with some example embodiments. The processes may enable a to be determined based on a subtraction of channel estimates from 3 consecutive packets.

In the example of FIG. 4, the direct signal 115 may be separated, in the time domain, from the reflected signal 120-122 as the direct path would be the first signal to arrive at the wireless access point and may be the strongest signal). Even when the user equipment is not line of sight to the wireless access point, the he direct path signal reaches the wireless access point before the reflected path signals.

FIG. 4 shows the time domain 402A (generated via an inverse FFT for example) of the first packet transmission sent via the smart surface in the first predetermined configuration (showing the first to arrive signal 410A which corresponds to the "Direct Path" and the second to arrive 415A which corresponds to the "Reflected Path"). FIG. 4 also shows the time domain 402B (generated via an inverse FFT for example) of the second packet transmission sent via the smart surface in the second predetermined configuration (showing the first to arrive signal 410B which corresponds to the "Direct Path" and the second to arrive 415B which corresponds to the "Reflected Path"). As noted above, the direct path signals 410A-B include (1) random phase errors (which cause the phase offset and packet detection offset due in part to lack of synchronization and/or other distortions) but do not include the phase offset caused by the smart surface. And, the reflected path signals 415A-B include (1) random phase errors and (2) include the phase offset caused by the smart surface. As explained further below, aligning in time 402A and 402B so that 410A and 410B (or, e.g., compensating for the time differences), removes the (1) random phase errors, such H1 and H2 can be combined as described above with respect to Equations 12 and 13 to determine the α (alpha). For the sake of brevity, FIG. 4 only depicts the alignment or correction process for the first packet (in which the smart surface is in a first predetermined configuration) and the second packet (in which the smart surface is in a second predetermined configuration), but the process of FIG. 4 may also include the third packet (in which the smart surface is in a third predetermined configuration) as well.

For example, the inverse FFT (IFFT) of the $H_{1measured}(f)$ may be determined and then used to obtain the time domain response, which may be used to detect or isolate the first peak signal corresponding to the direct path signal shown at FIG. 4. This process may be repeated for the second packet and the third packet. Even with the sampling time offset changing for each packet transmission, the first direct path is represented by the first peak. Each of the first peaks (e.g., to a common index such as 0 delay) may be aligned. Next, the complex amplitude value for the different packets at the peak (e.g., 0 delay) is determined. The phase error across all three packets is matched. At this stage, the subtraction among the channel response may be performed to achieve the cancellation.

Figure 5:
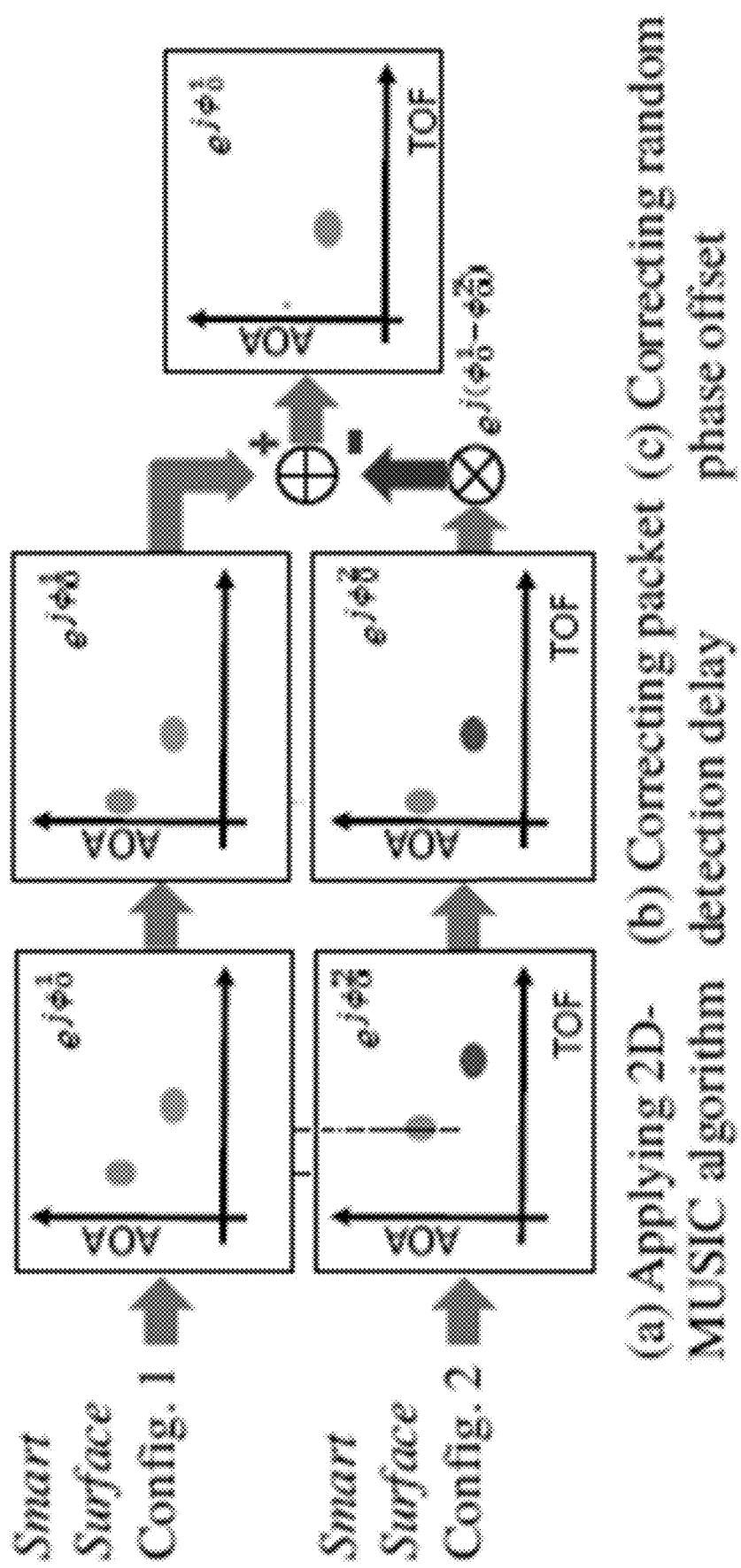

Instead of an IFFT, a 1D-Music algorithm may be used as well to isolate the multipath. The multi-path delays are resolved and then align the 0 delays with the shortest delay. Next, the complex amplitude of the shortest delay may be used to match the phase and perform the cancellation. The signal that is left post-cancellation is proportional to the relative reflection signal. To further improve the robustness of the noted process, the process may be extending the algorithm to two-dimension (2D) Music algorithm in space and time instead of just 1D-time. A similar process may be applied in 2D, as shown at FIG. 5. For example, a 2D-Music algorithm may be used to extract the multipath with their delays and angle of arrival information. Next, the first peak of each channel ToF-AoA is aligned to zero delays, thereby eliminating the sampling time offset. Next, the complex amplitude corresponding to the first path is isolated. The phase offset is measured and then phase offset for all the three packets is matched. At this stage, the packets can cancel to achieve the relative reflected signal, which is then used to calculate the value of a. Removing this phase drift from consecutive packets allows measuring a by subtracting the new channel estimates from consecutive packets.

The smart surface 150 may be set to maximize the power in the direction of $\theta_2$, which can deliver the maximum power to the user equipment. Even if the user equipment is not in line-of-sight, the algorithm figures out the signal direction which leads to the user equipment 112, which is sufficient to maximize the power at the user equipment. In other words, three channel measurements may be used to measure the direction of the user equipment from smart surface.

Figure 6:
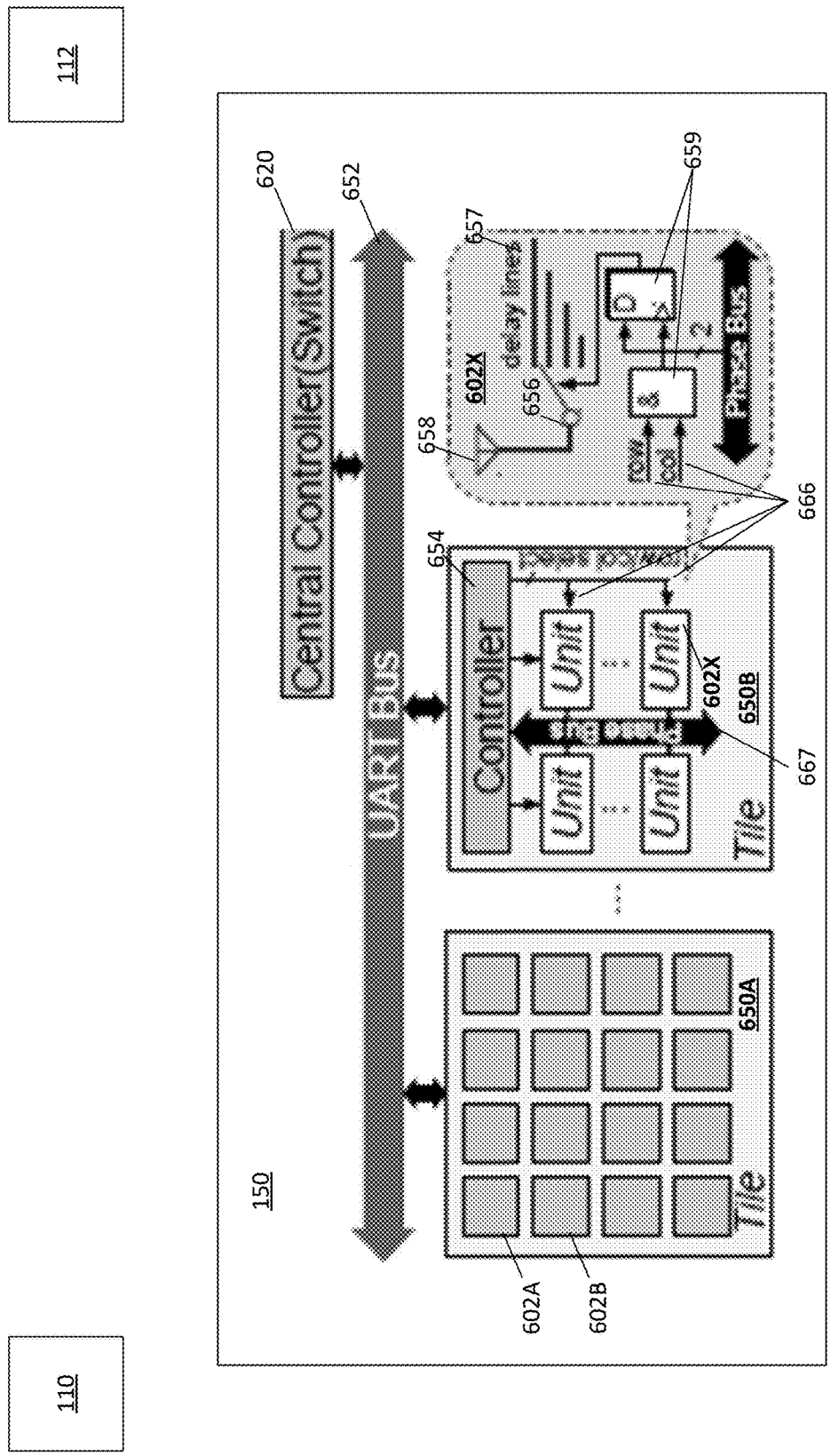
FIG. 6 depicts an example of an implementation of a smart antenna surface 150, in accordance with some example embodiments.

FIG. 6 depicts an example of an implementation of the smart surface 150, in accordance with some example embodiments. In the example of FIG. 6, the smart surface may include one or more tiles 650A-B. The tiles 650A-B are under the control of a central controller 620 via a bus 752, such as a UART bus. The central controller 750 may couple (via a wireless or wired connection) to the wireless access point, such as wireless access point 110, to obtain a phase configuration for the smart surface 150 including the tiles 650A-B. The controller 620 may then provide the phase configuration information to a local controller at each of the tiles. In the example of FIG. 6, the local controller 654 of tile 650B is depicted. The local controller 654 controls the phase offset at the antenna units, such as 602X. In the example of FIG. 6, the local controller switches 656 which of the delay lines 657 (each of which introduces a different delay or phase) are used at the antenna 658. In the example of FIG. 6, each of the tiles 650A-B hosts a matrix of phase shift programmable reflecting antennas, such as 602A, 602B, 602X, and so forth).

In the example of FIG. 6, the reflector unit includes a patch antenna, such as antenna 658, coupled to switch 656 (which in this example is a 5-GHz RF switch), which further coupled to delay lines 657 (e.g., 4 open-ended transmission lines). The patch antenna is a low profile antenna typically mounted on a surface. In this example, the transmission lines provide 0, π/2, π, and 3π/2 round-trip phase shifts, although other types of phase shifter may be used as well. The local controller 654 may be implemented as a low-power microcontroller to configure the RF switches 656. In the example of FIG. 6, each reflector unit includes its own addressable memory 659, which includes two flip-flops that latch their input when the reflector is selected by row and column select signals provided by the local controller 654. The input to each of the reflector units can then be wired together to a bus. In such a way, a tile module can have an arbitrary number of reflector units by simply replicating the basic reflector unit design, as long as the central controller can provide the row/column signals. The row and column select lines 666 are used to selects a phase shifter to be programmed. For example, in a 4×4 tile including 4 phase shifters, the row and column select lines 666 identify and selects which of the 4 phase shifters to program, and the phase bus 667 is used to provide the phase value to be programmed at the selected phase shifter. The same or similar control mechanism may be used to select an attenuator value at an antenna-phase shifter circuit.

The central controller 620 may send commands to the local controller 654 via the UART bus 654. These command may include contains the local controllers unique identifier (or serial number), so only the desired local controller for a given tile operates on the command. In an example implementation of the tile 650A, the tile measured 12.2 cm by 13.2 cm by 0.3 cm, although other dimensions are possible. This example shows the tile is thin and can be unobtrusively embedded into walls, placed hidden under a painting for example, or situated in other locations as well.

The wireless access point 110 may learn the direction of the user equipment 110. For example, the wireless access point may send explicit feedback packet transmission, which, when acknowledged by the user equipment, may generate additional predetermined transmissions (e.g., the 5 uplink packets) to optimize the smart surface's direction and the phase. For example, the explicit feedback packets may be short 60 μs packets, and may take a total of 400 μs to optimize the smart surface for a particular user equipment. The explicit feedback packets may encode the channel in the acknowledgments, which may be used to infer if the channel is coherent or changing too fast. Based on that, wireless access point may decide whether to use the smart surface. At some point, the smart surface needs to know which user equipment the packet is sent to or from. Since the wireless AP is close enough to the smart surface, a short range radio technology such as Bluetooth Low Energy (or some other type of radio technology) packets or even backscatter communication, may be used to send information about the use of the channel and potentially the user equipment information. The smart surface may then look up in a database to determine the last known best phase setting for the particular user equipment and program the phase shifters to use those settings. Similarly, when the user equipment or other device intends to send a packet, they can choose to inform the smart surface over Bluetooth Low Energy about the use of channel and the user equipment's identity. The advantage of a Bluetooth Low Energy control plane is its low-power and low latency (10-100 µs).

In some embodiments, when a location of any of the smart surface 150, access point 110, and/or user equipment 112 changes, the change in location is detected and a re-optimization of the smart surface is performed to determine the phase configuration of the smart surface. In some embodiments, the received signal power of the constructively added reflected path signals 122A-N may be measured, such that if the received signal power is below a threshold power a re-optimization of the smart surface is performed to determine the phase configuration of the smart surface.

Although some of the examples refer to MIMO, some wireless access points may include devices that are MIMO and devices that are single input single output (SISO) clients. Although the smart surface 150 cannot create additional spatial streams for SISO devices, the smart surface may still improve link performance (e.g., the SNR of the SISO link(s)), which may improve the throughput and coverage. In the case of SISO, the optimization goal is to maximize $|H|$ instead of $|H_{r,n}|$ (e.g., the reflected paths need to phase-match with the direct path at FIG. 1). The additional parameter $\phi_0$ (e.g., the base phase shift of the antennas) may be optimized to make sure that the reflected paths add constructively to the direct path.

To optimize for SISO links, Equation (10) is considered for the channel during the $i^{th}$ packet and at each sub-carrier $f_j$ which is as follows:

$$H(f_j)^i = H_d(f_j) + \sum_{n\in\{1,\ldots,N\}} H_{r,n}^i(f_j) \qquad (14)$$

$$= H_d(f_j) + e^{-j\phi_0^i}|H_{d1}(f_j)||H_{d2}(f_j)|$$

$$\sum_{n\in\{1,\ldots,N\}} e^{-jk(d_1+d_2+n\alpha)}$$

$$= H_d(f_j) + e^{-j\phi_0^i}H_r(f_j)$$

where $\phi_0^i$ is the base phase shift for i-th packet, and $H_r$ is the reflected channel without the base phase shift. The second term in this complex addition is rotated based on value of $\phi_0^i$. Once all the phases within the reflected path are optimized, $\phi_0^i$ determines whether the reflected path adds constructively to the direct path. To determine the phase rotation required on the reflected path, additional measurement packets may be sent (e.g., by the UE 112), each with the smart surface 150 set to a different base phase $\phi_0^i$, such as 0 and $\pi$ to enable measurements of $H_d(f_j)$ and $H_r^i, n(f_j)$, by subtracting these channel measurements. Knowing the two complex terms in Equation (14), $\phi_0$ may be selected among phase values that would maximize the average SNR over all sub-carriers:

$$\max_{\phi_0}(\Sigma_{f_j}\|H_d(f_j)+e^{j\phi_0}H_r(f_j)\|^2) \qquad (15)$$

where $\phi_0 \in (0, 2\pi)$ can take a few discrete choices to approximate infinite continuous phase values.

In the case of a MIMO system, there may be provided diversity gain and multiplexing gain, both of which may be improved based on the system 100. For example, additional coherent paths for each stream in a MIMO system may be created. Creating such a spatially diverse channel may thus improve MIMO channel rank regardless of the client's location or orientation.

Although some of the examples refer to MIMO, the subject matter herein may be used with other radio technologies including SISO-based systems.

The user equipment disclosed herein may include at least one processor, at least one memory, and one or more transceivers. For example, the user equipment may be comprised in or comprise a smart phone, a tablet, a wireless IoT device, a processor-based device (e.g., computer, laptop, etc.) coupled to a wireless transceiver, and/or other type of wireless device. Moreover, the user equipment may include one or more antennas. Alternatively, or additionally, the user equipment may include MIMO technology, in which case the UE may include a plurality of antennas. The UE may include one or more transceivers configured to operate in a radio technology, such as cellular (e.g., 5G, 4G, and the like), BlueTooth, Bluetooth Low Energy, satellite communications, and/or other radio technologies. The wireless access point disclosed herein may include at least one processor, at least one memory, and one or more transceivers. For example, the wireless access point may include one or more antennas. Alternatively, or additionally, the wireless access point may include MIMO technology, in which case the UE may include a plurality of antennas. The wireless access point may include one or more transceivers configured to operate in a radio technology, such as cellular (e.g., 5G, 4G, and the like), BlueTooth, Bluetooth Low Energy, and/or other radio technologies.

Although some of the examples refer to the wireless access point or the UE determining the configuration of the surface 150, a wireless network optimizer may for example determine the configuration of the surface (in terms of phase, amplitude, delay, and the like), such that the reflected signals constrictively add at the receiver.

As noted above, although some of the examples refer to Wi-Fi technology with respect to the surface 150, other radio technologies may be used as well including, for example, cellular (e.g., LTE, 5G, etc.), Bluetooth, Bluetooth Low Energy, satellite communications, and/or other radio technologies.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. An apparatus comprising:
a surface including at least one electro-magnetic reflective element programmed to provide a plurality of reflected signals, such that the plurality of reflected signals constructively add at a location of a receiver of the plurality of reflected signals, wherein the electro-magnetic reflective element is coupled to at least one at least one programmable phase shifter; and
a controller that configures the at least one programmable phase shifter, such that the plurality of reflected signals add constructively at the location of the receiver of the plurality of reflected signals, and wherein the controller programs, during a phase offset determination phase, the at least one phase programmable shifter in a first predetermined phase configuration, a second predetermined phase configuration, and a third predetermined phase configuration to enable a first packet, a second packet, and a third packet to be reflected toward the location of the receiver.

2. The apparatus of claim 1, wherein the constructive addition of the plurality of reflected signals provides, at the receiver, an increase in a signal-to-noise ratio, in a data rate, and/or a spatial multiplexing gain.

3. The apparatus of claim 1, wherein the at least one electro-magnetic reflective element includes at least one antenna, at least one meta-material, at least one patch antenna, and/or at least one reflective element.

4. The apparatus of claim 1, wherein the at least one programmable phase shifter includes at least one delay line configured to provide a delay that provides a phase shift to at least one of the plurality of reflected signals, wherein the phase shift enables the constructive addition of the plurality of reflected signals at the location of the receiver, without knowing a geolocation of the receiver.

5. The apparatus of claim 1, wherein the surface is programmed to provide an amplitude, a time delay, and/or a phase shift to at least one of the plurality of reflected signals to optimize a signal-to-noise, a data rate, and/or a spatial multiplexing gain.

6. The apparatus of claim 1, wherein the controller configures a delay, a phase, and/or an amplitude provided to at least one of the plurality of reflected signals.

7. The apparatus of claim 1, wherein the first predetermined phase configuration includes the at least one programmable phase shifter configured to provide a zero degree phase shift, the second predetermined phase configuration includes the at least one programmable phase shifter configured to provide an alternating sequence of 0 degree phase shift and 180 degree phase shift, the third predetermined phase configuration includes the at least one programmable phase shifter configured to provide an alternating sequence of 180 degree phase shift and 0 degree phase shift.

8. A method comprising:
receiving configuration information for an apparatus including a surface, the surface further including at least one electro-magnetic reflective element, wherein the electro-magnetic reflective element is coupled to at least one at least one programmable phase shifter; and
programing, based on the received configuration information, a configuration of the surface including the at least one electro-magnetic reflective element, such that a plurality of reflected signals constructively add at a location of a receiver of the plurality of reflected signals, wherein the programming further includes programming, during a phase offset determination phase, the at least one phase programmable shifter in a first predetermined phase configuration, a second predetermined phase configuration, and a third predetermined phase configuration to enable a first packet, a second packet, and a third packet to be reflected toward the location of the receiver.

9. The method of claim 8, wherein the constructive addition of the plurality of reflected signals provides, at the receiver, an increase in a signal-to-noise ratio, in a data rate, and/or a spatial multiplexing gain.

10. The method of claim 8, wherein the at least one electro-magnetic reflective element includes at least one antenna, at least one meta-material, at least one patch antenna, and/or at least one reflective element.

11. The method of claim 8, wherein the at least one programmable phase shifter includes at least one delay line configured to provide a delay that provides a phase shift to at least one of the plurality of reflected signals, wherein the phase shift enables the constructive addition of the plurality of reflected signals at the location of the receiver, without knowing a geolocation of the receiver.

12. The method of claim 11, wherein the configuration information includes a delay, a phase, and/or an amplitude to configure the surface to provide, at the location of the receiver, constructive addition of the plurality of reflected signals, and/or wherein the configuration information includes a polarization to configure at the surface.

13. The method of claim 8, wherein the first predetermined phase configuration includes the at least one programmable phase shifter configured to provide a zero degree phase shift, the second predetermined phase configuration includes the at least one programmable phase shifter configured to provide an alternating sequence of 0 degree phase shift and 180 degree phase shift, the third predetermined phase configuration includes the at least one programmable phase shifter configured to provide an alternating sequence of 180 degree phase shift and 0 degree phase shift.

14. The method of claim 8, wherein the configuration information is based on a plurality of measurements obtained during a phase offset determination phase, wherein the plurality of measurements provide an indication of a phase shift, a delay, and/or an amplitude to configure at the surface to enable the constructive addition.

15. The method of claim 14, wherein the plurality of measurements are corrected for timing differences at a transmitter and/or a receiver.

\* \* \* \* \*